(12) United States Patent
Imahata

(10) Patent No.: US 7,338,420 B2
(45) Date of Patent: Mar. 4, 2008

(54) VERSATILE TOOLHOLDER FOR NUMERICALLY CONTROLLED MACHINE TOOL FOR HOLDING TOOL THROUGH COLLET

(76) Inventor: Takeo Imahata, 7390 Woodsboro Ave., Anaheim, CA (US) 92807

( * ) Notice: Subject to any disclaimer, the term of this patent is extended or adjusted under 35 U.S.C. 154(b) by 0 days.

(21) Appl. No.: 11/121,486

(22) Filed: May 4, 2005

(65) Prior Publication Data

US 2006/0252618 A1    Nov. 9, 2006

(51) Int. Cl.
*B23Q 3/157* (2006.01)
(52) U.S. Cl. .................. 483/30; 409/232; 409/233; 408/239 A
(58) Field of Classification Search .................. 483/30; 409/231, 232, 233; 408/239 A, 240, 226; 279/143, 144, 145, 46.6, 83; 82/160, 158
See application file for complete search history.

(56) References Cited

U.S. PATENT DOCUMENTS

| 4,777,715 | A | * | 10/1988 | Roberts | ........................ | 483/30 |
| 5,403,132 | A | * | 4/1995 | Truesdell | ..................... | 409/233 |
| 6,602,031 | B2 | * | 8/2003 | Hara | .......................... | 409/131 |

* cited by examiner

*Primary Examiner*—Dana Ross
(74) *Attorney, Agent, or Firm*—Muramatsu & Associates

(57) ABSTRACT

A versatile toolholder system is provided that is used by a numerically controlled machine tool. The toolholder system has an attachment portion that has a standardized shape to allow the toolholder to be used by conventional numerically controlled machine tools. The toolholder system is comprised of a toolholder body, a collet adaptor that allows a desired collect to fit into the toolholder body, a pull-up means to pull a collet to fasten the collect in the toolholder body. Various sizes and configurations of collet adaptor can be used to accommodate various collets of different shapes and sizes.

8 Claims, 11 Drawing Sheets

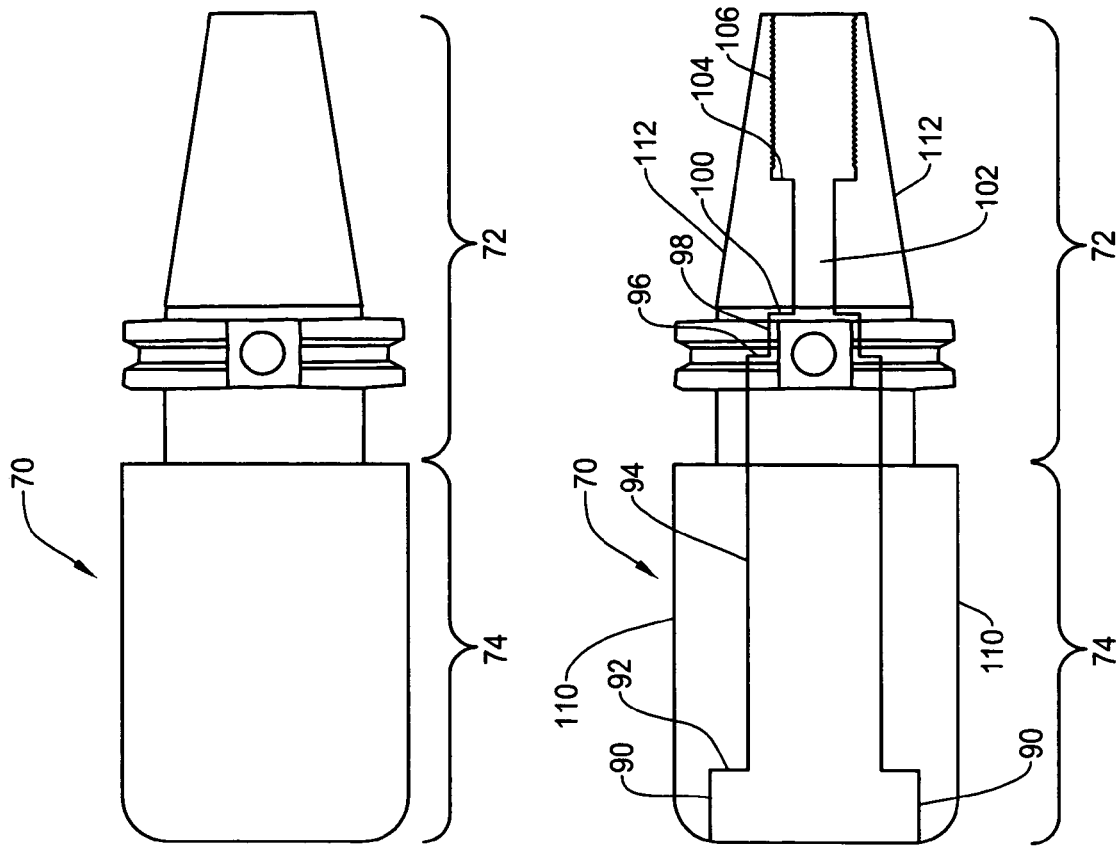

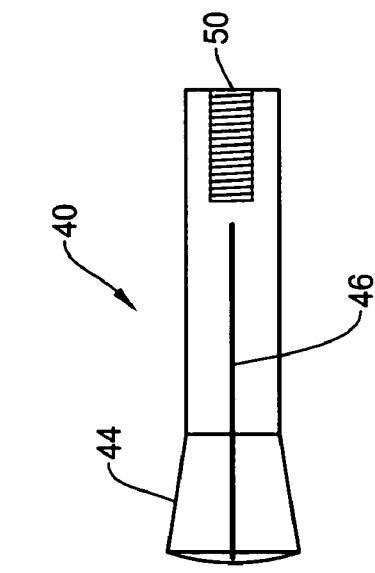
Fig. 5A
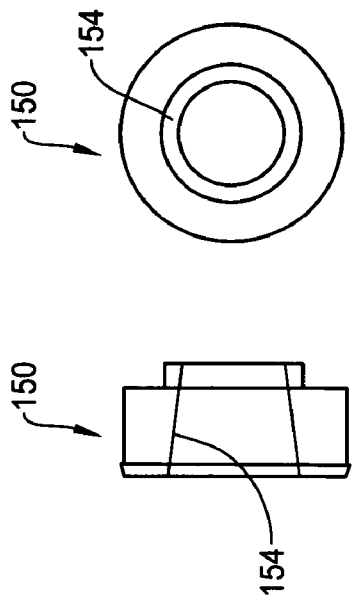
Fig. 5B
Fig. 5C
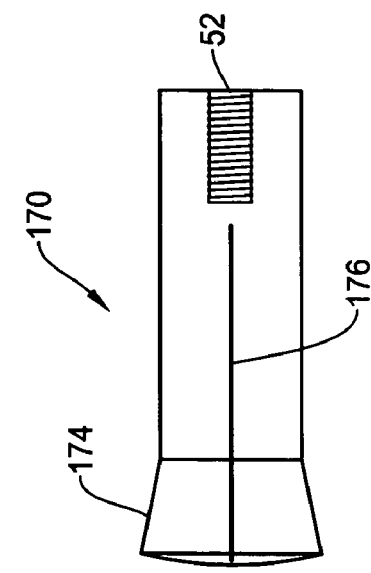
Fig. 5D
Fig. 5E
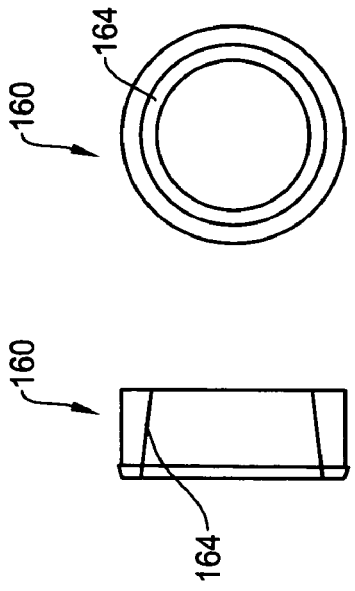
Fig. 5F

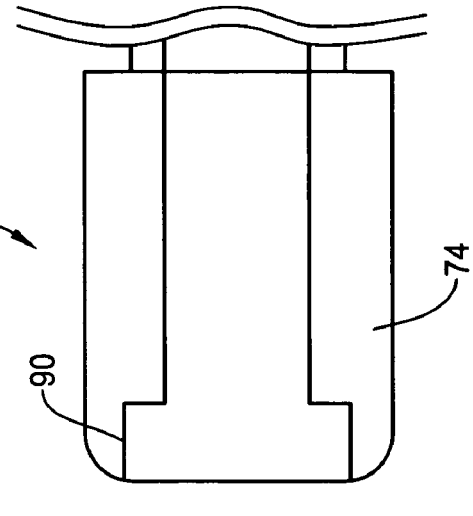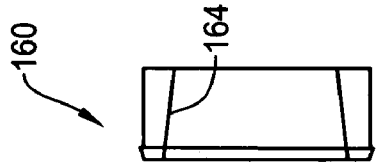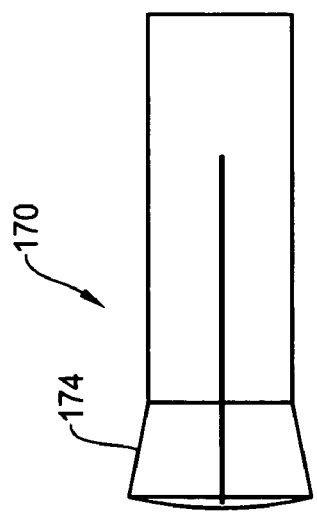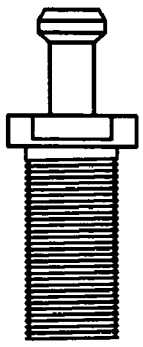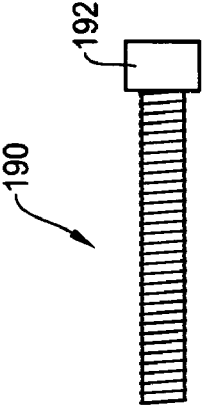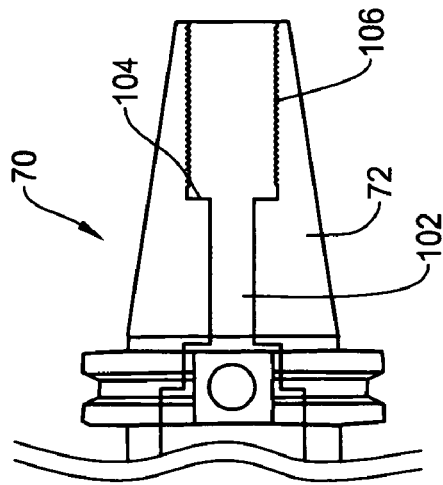

VERSATILE TOOLHOLDER FOR NUMERICALLY CONTROLLED MACHINE TOOL FOR HOLDING TOOL THROUGH COLLET

FIELD OF THE INVENTION

This invention relates to a toolholder for a numerically controlled machine tool, and more particularly, to a versatile toolholder for use with a numerically controlled machine tool that can hold a wide variety of tools by utilizing conventional collets.

BACKGROUND OF THE INVENTION

Numerically controlled machine tools are widely used today for machining works. Typically, a numerically controlled (NC) machine tool includes a wide variety of tools to allow precise machining by automatically controlling an operation of the machining tools and are primarily used for cutting, shaping, milling, turning, boring, drilling, grinding, or polishing of solid parts, such as metals. An example of basic configuration of an NC machine tool is shown a schematic diagram of FIG. 1.

As shown in FIG. 1, a typical NC machine tool 20 comprises a bed 12, with a table 6 which is carried on the bed 12 to be horizontally (X and X directions) and vertically (Z direction) movable on the bed 12. A work (not shown) to be machined is placed on the table 6 through a fixing means. A tool attachment mechanism (spindle) 8 is positioned over the table 6 for mounting a toolholder that holds a tool appropriate to a current process of machining. A control box 5 includes input means 4 such as a keyboard and a monitor 2 such as a CRT or an LCD display panel. The input means 4 functions as a man-machine interface and allows a user to input instructions and parameters to the NC machine tool 20. The monitor 2 displays the user's input data, current operation, various parameters for machining the work, etc.

An automatic tool exchanging device 10 is provided for automatically changing the tools appropriate for the types of machining process for the tool attachment mechanism 8. The automatic tool exchanging device 10 generally stores a plurality of tools from which it selects a suitable tool for the current job. The tools in the automatic tool exchanging device 10 are attached to the corresponding toolholders so that the selected tool is attached to the tool attachment mechanism 8 by the tool exchanging device 10.

Generally, toolholders to be used for NC machine tools are standardized in outer size and shape at the part which engages with the tool attachment mechanism. Thus, the tools can fit to an automatic tool exchanging device as well as to a tool attachment mechanism regardless of manufacturers or models of NC machine tools. The toolholders for NC machine tools for holding various tools are readily available in the market. One example of such a toolholder is illustrated in a front view of FIG. 2A.

A toolholder 30 shown in FIG. 2A is comprised of a tool holding portion 34 and an attachment portion 32. The attachment portion 32 has a hook 36 that will be inserted in the tool attachment mechanism 8. The attachment portion 32 is standardized so that the toolholder 30 can be used any standard NC machine tools. The tool holding portion 34 holds a tool (not shown), and the attachment portion 32 is fixed to the tool attachment mechanism 8 of the NC machine tool 20. The tool holding portion 34 is able to hold tools of different sizes and shapes.

As noted above, the outer shape and size of the attachment portion 32 is standardized to allow the toolholder 30 to be attached to the tool attachment mechanism 8 regardless of the manufacturer or type of the particular NC machine tools. Thus, as long as the toolholder 30 has the standardized shape and size of the attachment portion 32 as shown in FIG. 2A, the toolholder 30 can be used by different NC machine tools. When a tool is mounted on the tool attachment mechanism 8 through the toolholder 30, the NC machine tool knows the size and shape of the tool because of the machining program and controls the movement of the tool attachment mechanism (spindle) 8 and the table 6 incorporating the size and shape of the tool.

The toolholders 30 for NC machine tools described above have drawbacks in that they are generally expensive and can be financially burdensome especially for individual machinists to purchase many toolholders. Moreover, a user must have several different types of toolholders to accommodate various tools used for a project because inner structures of the toolholders are frequently different for accommodate different types of tools. It can be financially burdensome to purchase a new toolholder that is needed for a tool used only for a special project. Even when a machinist has a particular toolholder required for a project, a multiplicity of the same type of such toolholders may be necessary to complete the particular project.

Many machinists and machine houses generally have various collets that can attach to machine tools other than an NC machine tool. A collet is a type of toolholder for holding tools for traditional machine tool such as a lathe, milling machine, etc. An example of a collet is shown in a front view of FIG. 2B. Advantages of collets are that collets are relatively less expensive than toolholders used for NC machine tools and collets are readily available in the market. Moreover, because collets are common and traditionally used devices, machinists and machine houses are more likely to have a stock of them.

Accordingly, there is a need to combine the advantages of a collet used for traditional machining tools and a toolholder used for an NC machine tool, thereby allowing a desired tool to be used by an NC machine tool through a traditional collet without a NC machine toolholder for the particular tool.

SUMMARY OF THE INVENTION

It is, therefore, an object of the present invention to provide a versatile toolholder for a numerically controlled machine tool to use a tool for other machine tool.

It is another object of the present invention to provide a versatile toolholder for a numerically controlled (NC) machine tool for holding a collet for other machine tool for attachment of a tool to the NC machine tool.

It is a further object of the present invention to provide a versatile toolholder for an NC machine tool for using a wide variety of tools for traditional machines by the NC machine tool through corresponding collets.

In one aspect of the present invention, a versatile toolholder for a numerically controlled machine tool is comprised of: a toolholder body having an attachment portion that has a shape that allows the attachment portion to be attached to an attachment mechanism of a numerically controlled machine tool, and a tool holding portion having an inner space for storing a collect therein; a collet adaptor having an inner opening that snugly fits to a tapered portion of the collet, and an outer surface that snugly fits into a circumferential opening at an end of the toolholding portion of the toolholder body; and a pull-up means to pull the collet toward the inside of the toolholder body to fasten the tapered portion of the collet by the collet adaptor, thereby attaching the collet to the toolholder body; wherein the collet tightly clamps a tool for a traditional machine tool when it is pulled toward the inside of the toolholder body.

In a further aspect of the present invention, the versatile toolholder for a numerically controlled machine tool further comprises a hook portion that is attached to the end of the attachment portion. The hook portion attached to the end of the attachment portion is inserted in the attachment mechanism of the numerically controlled machine tool when mounting the tool on the numerically controlled machine tool.

In a further aspect of the present invention, in the versatile toolholder for a numerically controlled machine tool, the attachment portion has a conical shape whose size is standardized to match with attachment mechanisms of numerically controlled machine tools of different makes and types.

In a further aspect of the present invention, in the versatile toolholder for a numerically controlled machine tool, the toolholder having the collet and the tool clamped by the collet is brought to the attachment mechanism of the numerically controlled machine tool by an automatic tool exchanging device to be mounted on the numerically controlled machine tool.

In a further aspect of the present invention, in the versatile toolholder for a numerically controlled machine tool, the pull-up means to pull the collet is a screw. The screw to pull the collet has a screw head that is hooked to a stopper wall provided at the inside of the toolholder body to fixate the screw.

According to the present invention, the toolholder of the present invention has the standard size and shape at the attachment portion thereof while the toolholding portion is designed to accommodate traditional collets of different sizes. Thus, the toolholder of the present invention enables to attach the tool for the conventional machine tool to the NC machine tool through the collet. Since the tools and collets for traditional machine tools are less expensive and wide variety of them are readily available in the market, the toolholder of the present invention enables to use such tools on the NC machine tool at low cost.

BRIEF DESCRIPTION OF THE DRAWINGS

FIG. 3A is a front view of a versatile toolholder of the present invention to be used in a numerically controlled machine tool, FIG. 3B is a front view of the versatile toolholder where an inside cross sectional structure is also shown.

FIGS. 5A to 5H show collet adapters and collets for use with the toolholder of the present invention. FIGS. 5A-5C show relationship between a small collet and a collet adaptor designed for the small collet where FIG. 5A is a front view of the collet adaptor, FIG. 5B is a side view of the collet adaptor, and FIG. 5C is a front view of the small collet. FIGS. 5D-5F show relationship between a large collet and a collet adaptor designed for the large collet where FIG. 5D is a front view of the collet adaptor, FIG. 5E is a side view of the collet adaptor, and FIG. 5F is a front view of the large collet. FIG. 5G is a front view showing the condition where the collet adaptor and the small collet of FIGS. 5A-5C are attached to one another, and FIG. 5H is a front view showing the condition where the collet adaptor and the large collet of FIGS. 5D-5F are attached to one another.

FIG. 6A is a front view thereof and FIG. 6B is a side view thereof.

FIG. 7A is a front view thereof and FIG. 7B is a side view thereof.

FIGS. 8A-8F schematically show structural relationships among a collet, a collet adaptor, a toolholder body, a screw for the collet, and a hook portion screw of the toolholder where FIG. 8A shows a collet, FIG. 8B shows a collet adaptor, FIG. 8C shows a cylindrical body of the toolholder body, FIG. 8D shows a conical body at the attachment portion of the toolholder body, FIG. 8E shows a collet screw, and FIG. 8F shows a hook portion screw of the toolholder.

DETAILED DESCRIPTION OF THE INVENTION

The present invention will be described in detail with reference to the accompanying drawings. Under the present invention, a versatile toolholder is adaptable to a numerically controlled (NC) machine tool. The versatile toolholder is able to accommodate a collet therein so that a tool attached to the collet can be used by the NC machine tool. In other words, the versatile tool holder of the present invention has the standard size and shape at its outside of the attachment portion for an NC machine tool while having a specific inner structure to install a collet therein. Accordingly, any traditional tool for traditional machine tools for drilling, cutting, etc., that can be clamped by the collet can be used by the NC machine tool. Thus, various tools can be used for the NC machine tool through the traditional collets.

Figure 1:
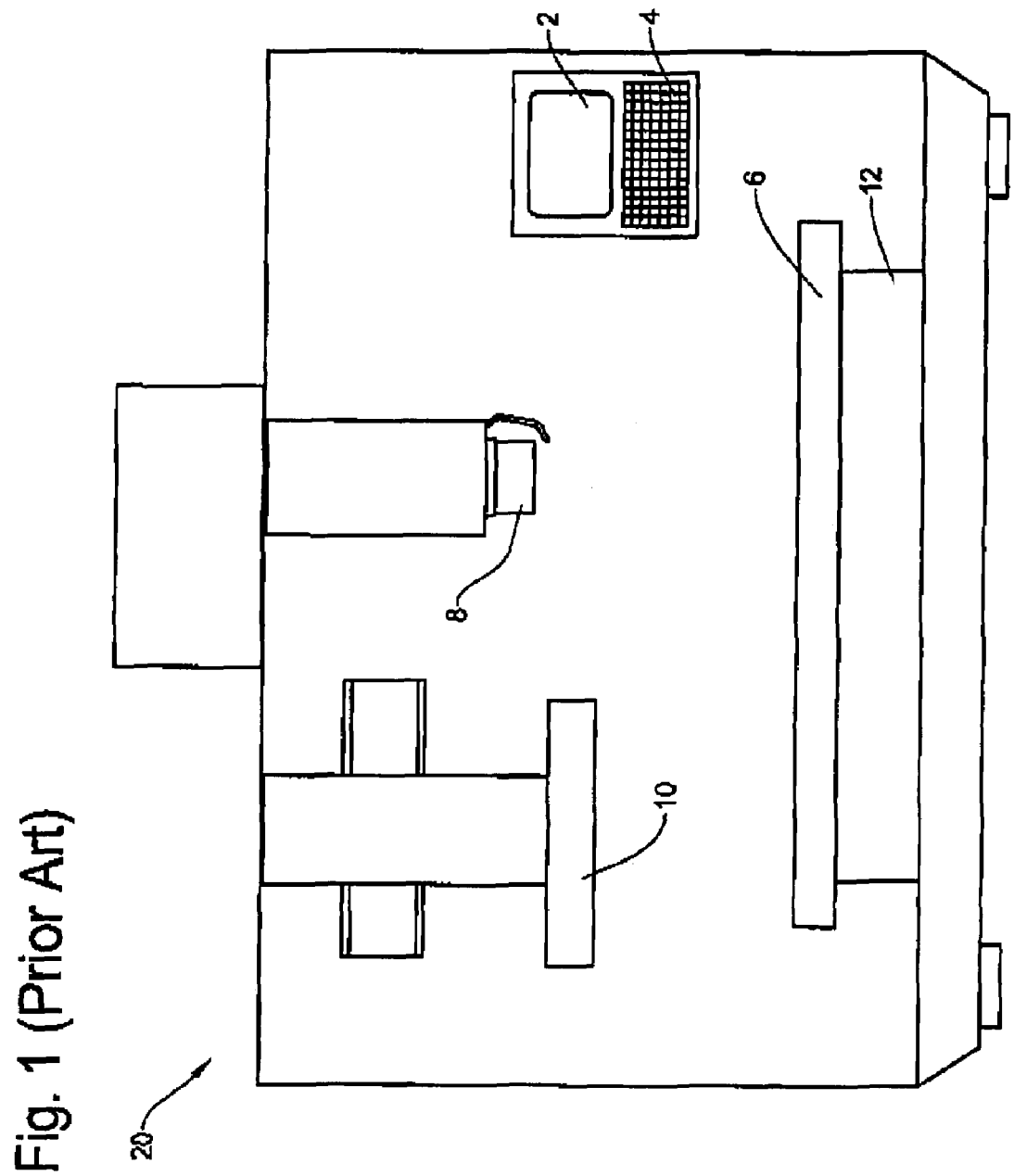
FIG. 1 is a schematic diagram showing an example of basic configuration of a numerically controlled machine tool to apply a toolholder of the present invention.
Figure 3C:
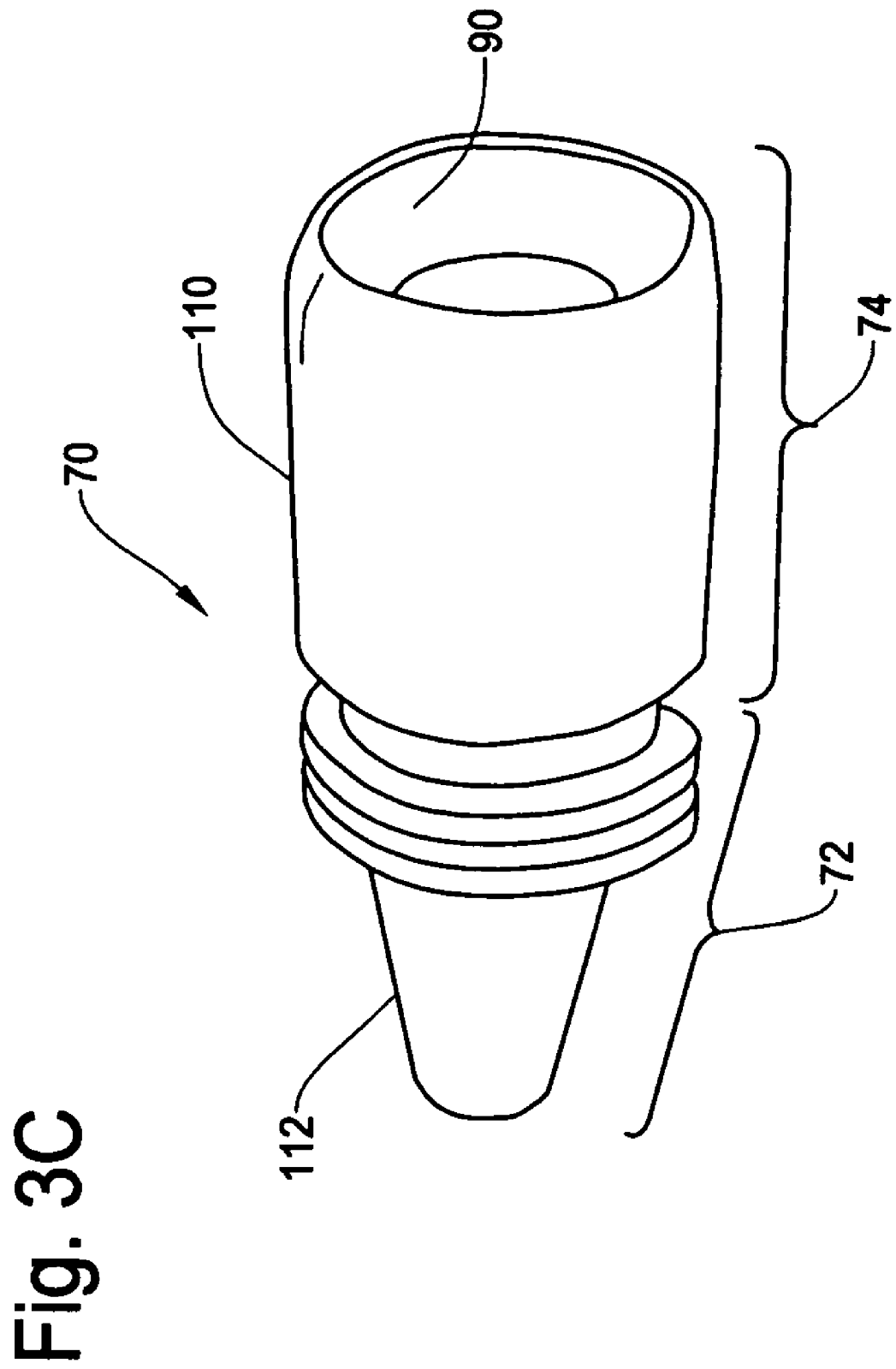
FIG. 3C is a perspective view of the versatile toolholder in the present invention.

FIGS. 3A-3C show the toolholder of the present invention to be used in an NC machine tool through the attachment mechanism 80 of the NC machine tool (FIG. 1). In a front view of FIG. 3A, a toolholder (toolholder body) 70 in the present invention is conceptually divided into an attachment portion 72 and a holding portion 74. The attachment portion 72 is a standardized configuration for use in NC machine tools through the attachment mechanism. The holding portion 74 has an inner space to install a selected collet with a collet adaptor therein.

Figure 2A:
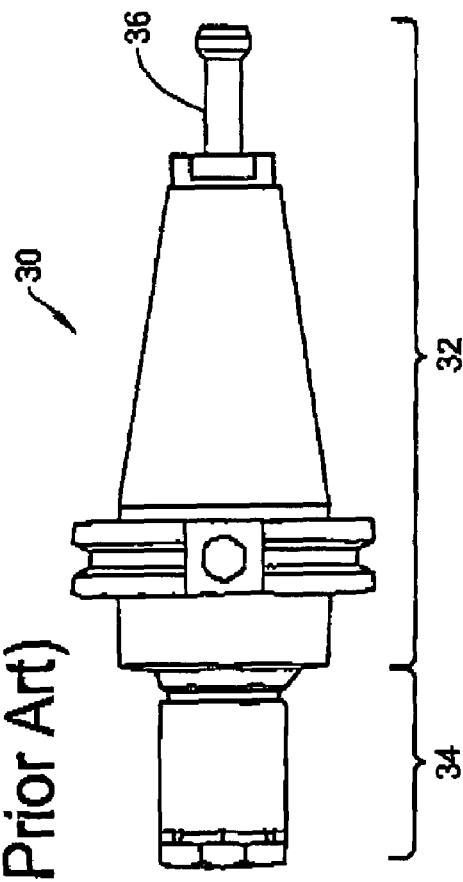
FIG. 2A is a front view showing an example of toolholder used in a numerically controlled machine tool having an attachment portion and a toolholding portion.
Figure 2C:
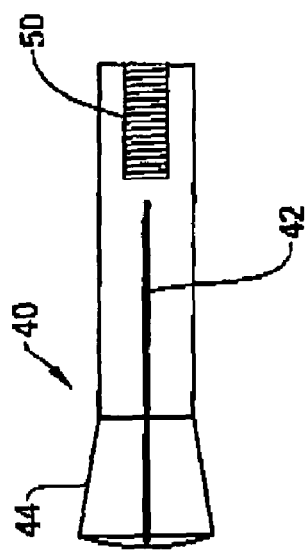
FIG. 2C is a front view of the collet of FIG. 2B.
Figure 2B:
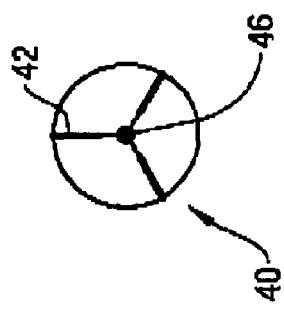
FIG. 2B is a side view showing an example of collet used in a traditional machine tool.

Since the attachment portion 72 is standardized, the shape and size of the attachment portion 72 is substantially the same as that of the conventional toolholder's attachment portion shown in FIG. 2A except that the attachment portion 72 does not have the hook portion shown in FIG. 2A. However, a part that is equivalent to the hook portion will be attached when assembling the toolholder as will be described in detail later. In a preferred embodiment, the toolholder 70 is made of aluminum although many other metal material can be used for this purpose.

FIG. 3B is a view corresponding to the front view of FIG. 3A and further shows a cross sectional inner structure of toolholder. The toolholder 70 has an inner hole extending from the left end of the holding portion 74 to the right end of the attachment portion 72. The inner hole is to install a traditional collet for a machine tool so that a variety of tools such as a drilling tool, boring tool, etc, can be attached to the NC machine tool.

FIG. 3C is a perspective view of the toolholder 70 of the present invention. As shown, the toolholder 70 is configured by an attachment portion 72 having a conical body 112 and the holding portion 74 having a cylindrical body 110 and a circumferential opening 90. The circumferential opening 90 is provided at the end of the holding portion 74. As will be explained later in detail, the circumferential opening 90 holds a collet adaptor prepared for the toolholder 70 for tightly attaching the collet clamping a tool.

Referring back to FIG. 3B, the toolholder 70 has an inner circular opening from one end to the other end thereof. The toolholder 70 is configured by the attachment portion 72 having the conical body 112 and the holding portion 74 having the cylindrical body 110. The toolholder 70 has a first circumference opening 90 at the end of the cylindrical body 110, a first opening end (first step) 92, a second circumference opening 94, a second opening end (second step) 96, a third circumference opening 98, a third opening end (third step) 100, a screw opening 102, a stopper wall 104, and a screw opening 106.

The first circumference opening 90 and the first opening end 92 are used to hold a collet adaptor created for a collet which will be explained in detail with reference to FIGS. 5A-5F. The second circumference opening 94 and the second opening end 96 serve as a storage space for a collet that clamps a selected tool. The third circumference opening 98, the third opening end 100, and the screw opening 102 serve as a hole through which a collet screw (pull-up screw) 190 penetrates to tightly attach the collet in the storage space of the toolholder 70. The screw opening 106 has thread on its inner wall for attaching a hook portion screw 186 of the toolholder 70 which is required for the standard attachment mechanism of the NC machine tool.

Figure 4B:
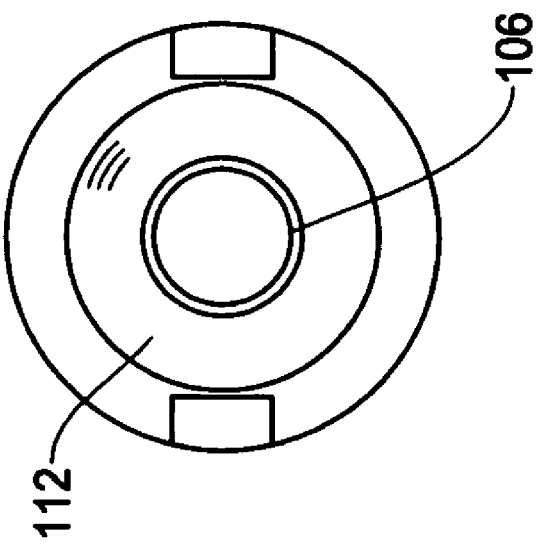
FIG. 4B is a right side view of the versatile toolholder in the present invention.
Figure 4A:
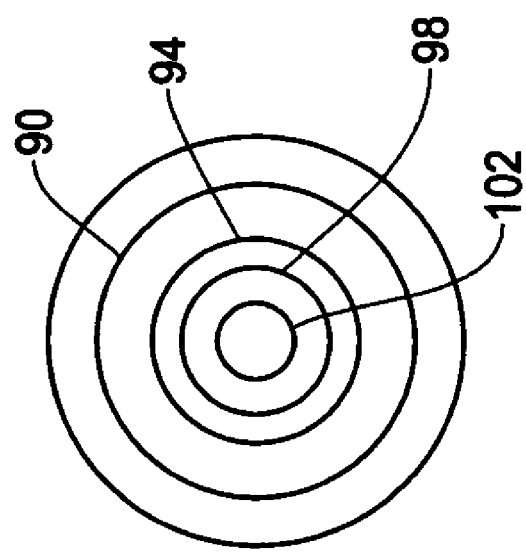
FIG. 4A is a left side view of the versatile toolholder in the present invention shown in FIGS. 3A-3C to be used in a numerically controlled machine tool.

FIG. 4A is a side view of the toolholder body 70 as viewed from the holding portion 74, i.e, the end of the cylindrical body. FIG. 4B is a side view of the toolholder body 70 as viewed from the attachment portion 72, i.e., the end of the conical body. As shown in FIGS. 4A and 4B, the toolholder body has a substantially tubular shape and holes of different sizes are formed on the same axis from one end to the other end. The numerals for the openings in FIGS. 4A and 4B correspond to those in FIG. 3B.

FIGS. 5A to 5F show collet adapters and their relationship with corresponding collets. The collet adaptor is to match the size of the collet with the first circumference opening 90 of the toolholder 70 of FIGS. 3A-3C when the collet with a tool is attached to the toolholder. In other words, the toolholder of the present invention is able to accommodate collets of different sizes with use of corresponding collet adapters. Since the tools and collets for traditional machine tools are less expensive and wide variety of them are readily available in the market, the toolholder of the present invention enables to use such tools on the NC machine tool at low cost.

The collets of different size and corresponding collet adapters are shown in the drawings. As noted above, collets are used as toolholder for traditional machine tools and collets of various sizes are readily available in the market. Collets are widely used for machine tools other than NC machine tools and are less expensive than the toolholder for NC machine tools. Since the toolholder of the present invention can attach the collets, tools for traditional machine tools can be used for the NC machine tool.

FIGS. 5A-5C show the relationship between a collet of relatively small size and a collet adaptor designed for the small collet. FIG. 5A is a front view of the collet adaptor, FIG. 5B is a side view of the collet adaptor, and FIG. 5C is a front view of the small collet. FIGS. 5D-5F show the relationship between a collet of relatively large size and a collet adaptor designed for the large collet. FIG. 5D is a front view of the collet adaptor, FIG. 5E is a side view of the collet adaptor, and FIG. 5F is a front view of the large collet.

A collet adaptor 150 shown in FIGS. 5A-5B is designed for a small collet 40 shown in FIG. 5C. The outer surface of the collet adaptor 150 is designed to fit the first circumferential opening 90 of the toolholder body 70. The collet 40 has a plurality of slits 46 so that a tool (not shown) can be inserted in a center opening at the left end of the collet 40 in FIG. 5C. The collet 40 has a tapered portion 44 where the slits 46 are formed, thus, when the tapered portion 44 is tightened, the tool is firmly attached to the collet 40. The collet 40 also has a screw thread 50 at the right end of FIG. 5C.

The collet adaptor 150 of FIGS. 5A and 5B has a tapered portion 154 which is designed to snugly fit with the tapered portion 44 of the collet 40. As will be described later, when the collet 40 is pulled toward the right by fastening a collet screw in the screw thread 50, the tapered portion 44 of the collet 40 is tightened by the tapered portion 154 of the collet adaptor 150. Thus, the collet 40 can tightly close the center opening to securely hold the tool (not shown) while being attached to the toolholder 70 for use with an NC machine tool.

A collet adaptor 160 shown in FIGS. 5D-5E is designed for a large collet 170 shown in FIG. 5F. The outer surface of the collet adaptor 160 is designed to fit the first circumference opening 90 of the toolholder body 70. Thus, the shape and size of the outer surface of the collet adaptor 150 of FIGS. 5A-5B and that of the outer surface of the collet adaptor 160 of the collet 170 are identical to one another. The collet 170 of FIG. 5F has a plurality of slits 176 so that a tool (not shown) can be inserted in a center opening at the left end of the collet 170 in FIG. 5F. The collet 170 has a tapered portion 174 where the slits 176 are formed, thus, when the tapered portion 174 is tightened, the tool is firmly attached to the collet 170. The collet 170 also has a screw thread 52 at the right end of FIG. 5F.

The collet adaptor 160 of FIGS. 5D and 5E has a tapered portion 164 which is designed to snugly fit with the tapered portion 174 of the collet 170. As will be described later, when the collet 170 is pulled toward the right by fastening a collet screw in the screw thread 52, the tapered portion 174 of the collet 170 is tightened by the tapered portion 164 of the collet adaptor 160. Thus, the collet 170 can tightly close the center opening at the left end to securely hold the tool (not shown) while being attached to the toolholder 70 for use with an NC machine tool.

Figure 5G:
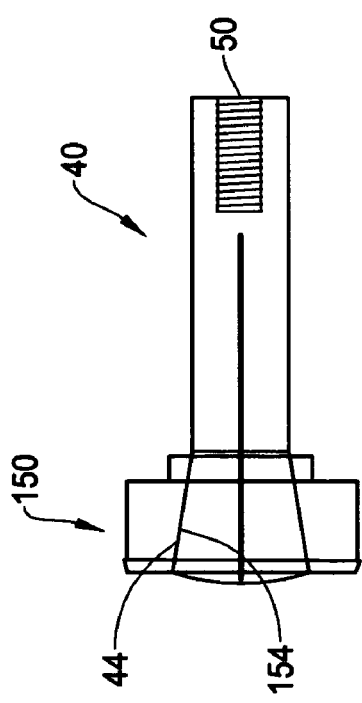
Figure 5H:
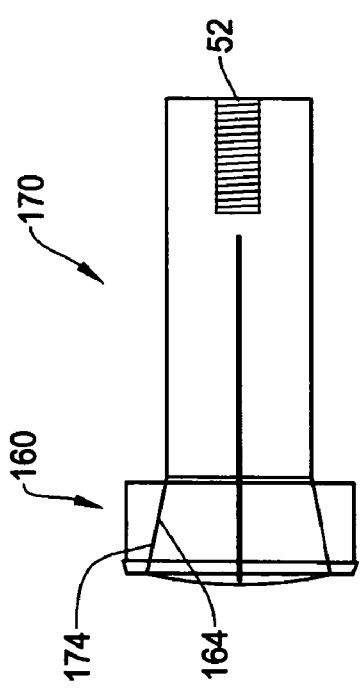

FIG. 5G is a front view showing the condition where the collet adaptor 150 and the small collet 40 of FIGS. 5A-5C are attached to one another. FIG. 5H is a front view showing the condition where the collet adaptor 160 and the large collet 170 of FIGS. 5D-5F are attached to one another. In the condition of FIG. 5G, the tapered portion 44 of the small collet 40 is snugly fit to the tapered portion 154 of the collet adaptor 150. In the condition of FIG. 5H, the tapered portion 174 of the large collet 170 is snugly fit to the tapered portion 164 of the collet adaptor 160. Such conditions will arise when the collet having a tool is installed and fastened in the toolholder 70 through a collet screw 190 of FIGS. 7A and 8E.

Although the above example of the collet adaptor has circular openings to hold a cylindrical collet, the opening of the collet adaptor may take various shapes to accommodate a particular shape and configuration of a collet to be used. Thus, the shape of the opening of the collet adaptor is not limited to a circular opening described in the description and drawings. However, the outer shape of the collet adaptor has to match the inner shape of the first circumference opening 90 of the toolholder body 70.

Figure 6A:
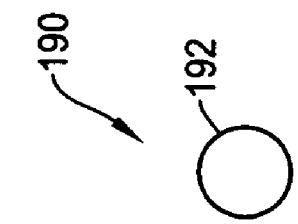
FIGS. 6A and 6B show a hook portion screw to be attached to an end of the versatile toolholder of the present invention where
Figure 6B:
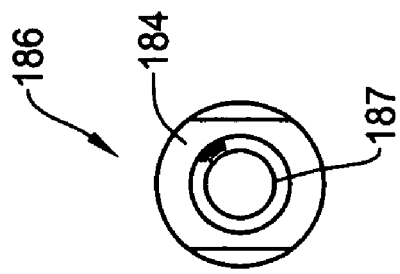

FIGS. 6A and 6B show a hook portion screw 186 which is inserted in the toolholder body 70. The hook portion screw is to attach the toolholder body 70 to the NC machine tool through the standard attachment mechanism 8 shown in FIG. 1. Thus, the hook portion screw 186 is the same as the hook 36 of the toolholder 30 shown in FIG. 2A except for its thread portion. FIG. 6A is a front view showing the shape of the hook screw portion 186, and FIG. 6B is a side view of the hook screw portion 186 as seen from the right end of FIG. 6A. The hook screw portion 186 is configured by a thread portion 188, a screw head 184, and an end portion 187. The screw portion 188 fits the screw opening 106 of the toolholder body 70.

Thus, when the hook screw portion 186 is completely screwed in the toolholder body 70, the attachment portion 72 will become identical to the attachment portion 32 of the standard toolholder 30 shown in FIG. 2A. In other words, the shape and size of the attachment portion 72 is identical to the standardized shape and size of the toolholder for an NC machine tool. Thus, the toolholder body 70 of the present invention can be used by an NC machine tool while using a tool for a traditional machine tool through a traditional collet.

Figure 7A:
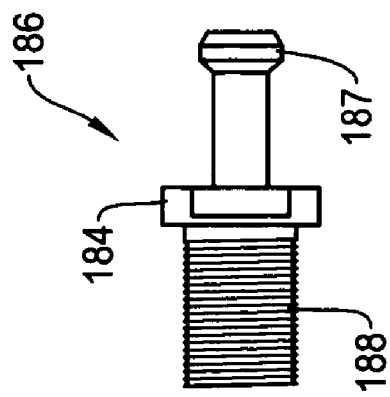
FIGS. 7A and 7B show a collet screw that is used to pull up a collet inside the versatile toolholder of the present invention where
Figure 7B:
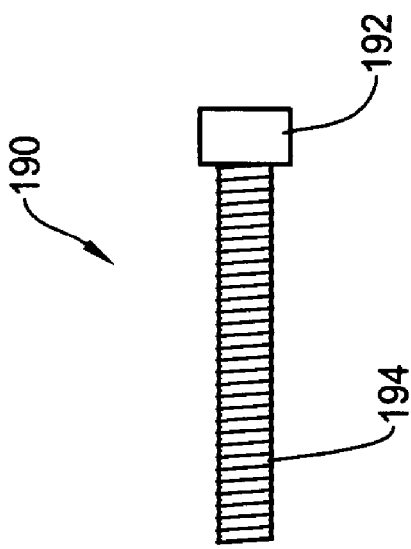

FIGS. 7A and 7B show a collet screw (pull-up screw) 190 which is used for pulling a collet toward the inward of the toolholder 70. When the collet is pulled in this manner, the opening of the collet having a tool is fastened by the taper portion of the collet adaptor to tightly hold the collet in the toolholder 70. FIG. 7A is a front view showing the pull-up screw 190 configured by a thread portion 194 and a head 192. FIG. 7B is a side view of the pull-up screw 190 as seen from the right end of FIG. 7A. The thread portion 194 screws in the screw thread 50 or 52 (FIGS. 5A and 5F) of the collet.

When the pull-up screw 190 is fastened in the toolholder 70, the head portion 192 is fitted to the stopper wall end 104 (FIG. 3B). By further screwing the pull-up screw 190, the collet is moved to the direction of the hook portion screw 186, i.e, in the direction opposite to the first circumferential opening 90 of the toolholder body 70. Because of the tapered portions of the collet adaptor and the collet, the slits of the collet are fastened as the collet is pulled by the pull-up screw 190, thereby fastening the tool in the center opening of the collet. Thus, the collet having the tool is firmly attached to the toolholder 70.

FIGS. 8A-8F are schematic diagrams showing as to how the components described above are assembled with one another to form the toolholder of the present invention. FIG. 8A shows the collet 70 for clamping a tool, FIG. 8B shows the collet adaptor 160 for tightening the collet 170, FIG. 8C shows a cylindrical body (holding portion 74 shown in FIG. 3B) of the toolholder body 70, FIG. 8D shows a conical body (attachment portion 72 shown in FIG. 3B) of the toolholder body 70, FIG. 8E shows the collet screw (pull-up screw) 190 for pulling the collet 170 toward the inside of the toolholder body 70, and FIG. 8F shows the hook portion screw 186 of the toolholder.

The tapered portion of the collet 170 of FIG. 8A fits to the tapered portion of the collet adaptor 160 of FIG. 8B as shown in FIG. 5H. The outer surface of the collet adaptor 160 fits to the first circumference opening 90 of the toolholder body 70 of FIG. 8C. The pull-up screw 190 of FIG. 8E is inserted from the opening provided at the attachment portion of the toolholder body 70 of FIG. 8D. The head portion 192 of the pull-up screw 190 is small enough to pass through the opening 106 but is large enough to act as a hook against the end (stopper wall) 104. Thus, when the pull-up screw 190 is tightened, the collet 170 is pulled toward the inside of the toolholder 70, thereby fastening the collet 170 by the collet adaptor 160.

The hook screw 186 is screwed into the screw opening 106 of the toolholder body 70 of FIG. 8D to close the opening 106. The hook screw 186 forms a hook at the end of the attachment portion 72, thereby creating the standardized shape of the toolholder for the attachment with the NC machine tool through the attachment mechanism 8 (FIG. 1). Accordingly, the toolholder of the present invention enables to attach the tool for the conventional machine tool to the NC machine tool through the collet.

Figure 9:
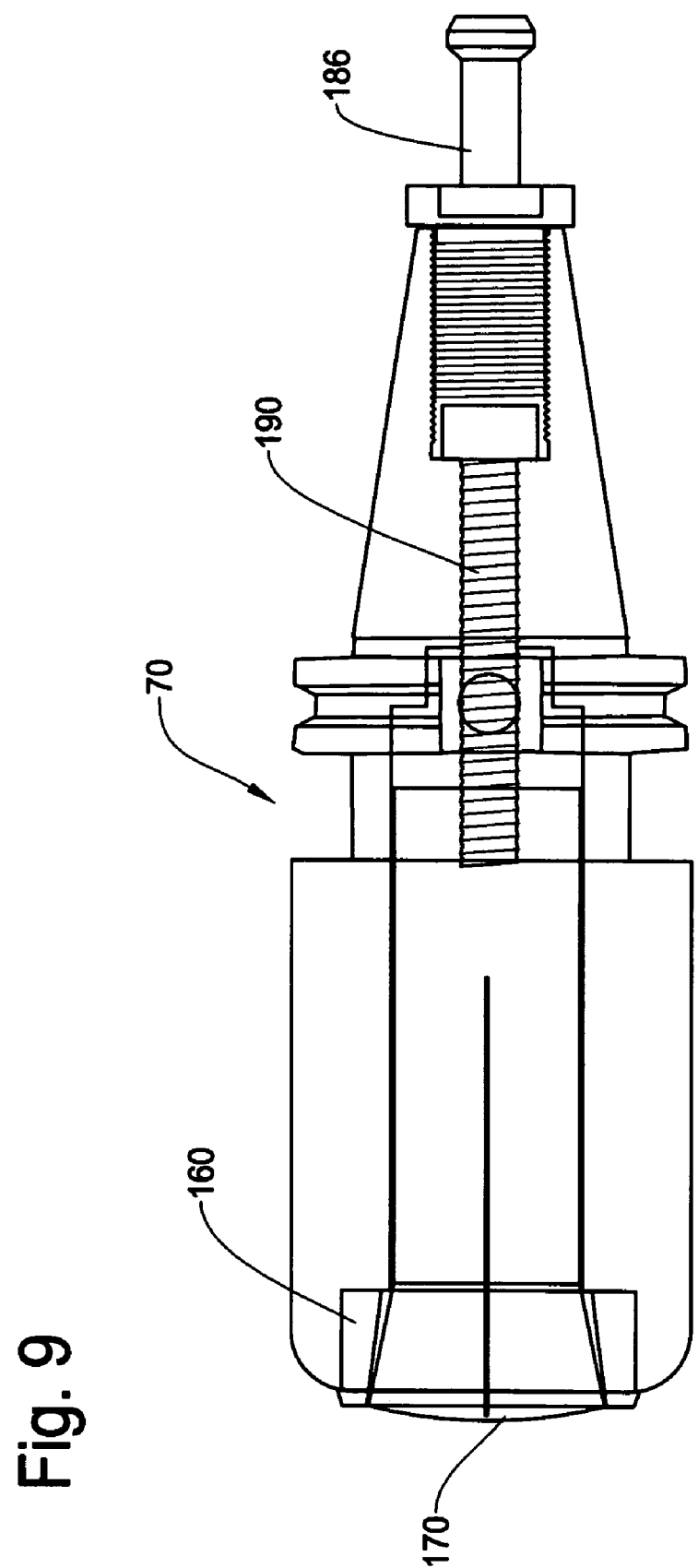
FIG. 9 is a schematic view showing an assembled condition of the collet, collet adaptor, toolholder body, collet screw, and hook portion screw in the present invention, where structural relationships among these members when assembled in the toolholder are also illustrated.

FIG. 9 is a partial cross sectional view of the toolholder of the present invention showing the assembled components. The collet 170 is inserted in the collet adaptor 160 as shown in FIG. 5H and is inserted in the first circumferential opening 90 at the left end of the toolholder 70. The collet 170 is pulled by the pull-up screw 190 toward the right, thus, the tool (not shown) at the left end of the collet 170 is tightened by the collet adaptor 160. As a consequence, the tool (not shown) and the collet 170 clamping the tool are tightly attached to the toolholder 70. The hook portion screw 186 closes the screw opening 106 at the right end of the toolholder to form the standardized shape and size of the attachment portion 72 of the toolholder 70 for the NC machine tool.

Figure 10:
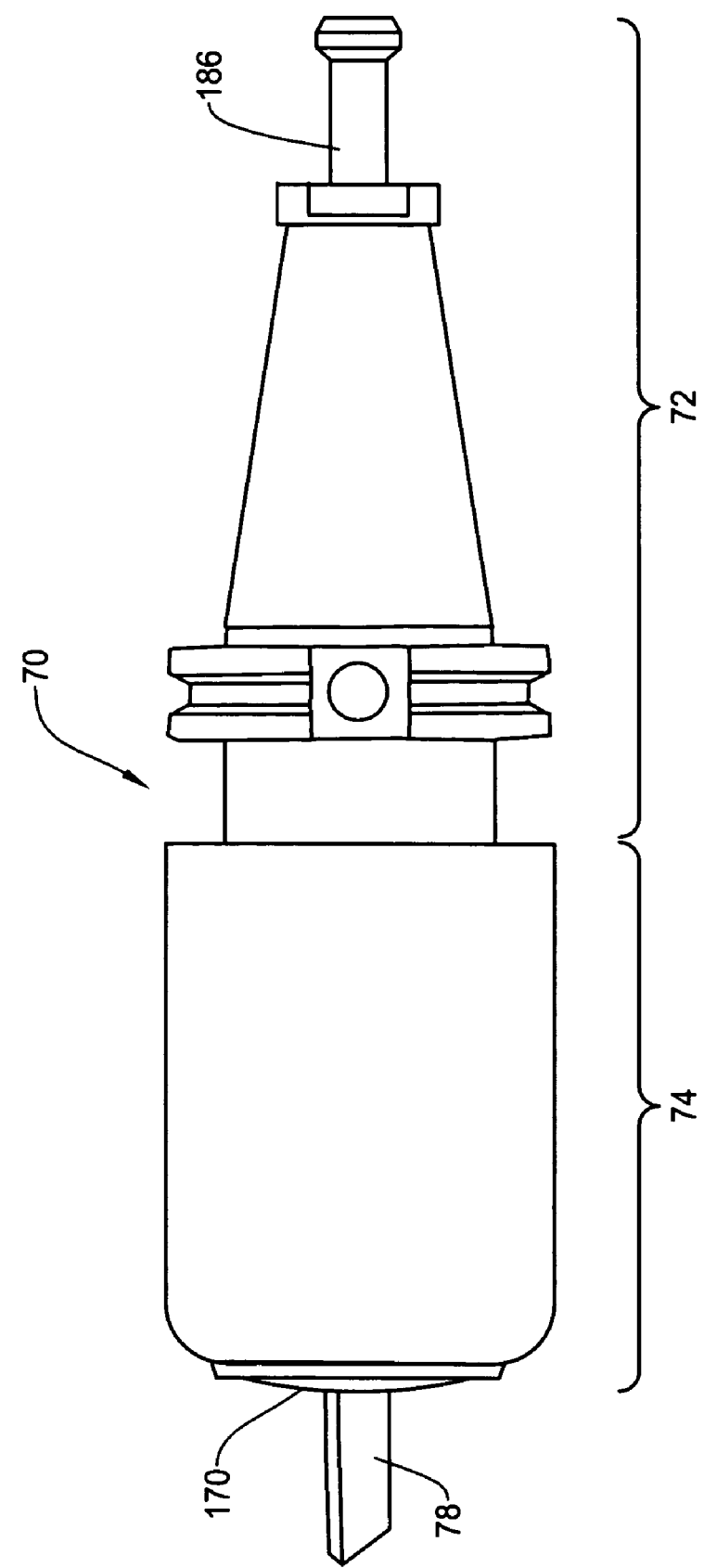
FIG. 10 is a schematic view showing an outer appearance of the assembled condition of the collet, collet adaptor, toolholder body, collet screw, and hook portion screw in the present invention.

FIG. 10 is a schematic diagram showing an outer appearance of the toolholder in the present invention when the assembly is completed. The attachment portion 72 is identical to the attachment portion 32 of the conventional toolholder shown in FIG. 2A. The holding portion 74 has a shape and size different from the toolholder of FIG. 2A to accommodate the collet 170 having a tool 78 to use the traditional tool 78 for the ordinary machine tool through the collet.

According to the present invention, the toolholder of the present invention has the standard size and shape at the attachment portion thereof while the toolholding portion is designed to accommodate traditional collets of different sizes. Thus, the toolholder of the present invention enables to attach the tool for the conventional machine tool to the NC machine tool through the collet. Since the tools and collets for traditional machine tools are less expensive and wide variety of them are readily available in the market, the toolholder of the present invention enables to use such tools on the NC machine tool at low cost.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A versatile toolholder system for a numerically controlled machine tool, comprising
   a toolholder body having an attachment portion that has a shape that allows said attachment portion to be attached to an attachment mechanism of a numerically controlled machine tool, and a tool holding portion having an inner space for storing a collet therein;
   a plurality of collets with different shapes and sizes for clamping corresponding tools for a non-numerically controlled machine tool;
   a plurality of collet adaptors for the collets with different shapes and sizes, each having an inner opening with a tapered portion that snugly fits to a tapered portion of the collet, and an outer surface that snugly fits into a circumferential opening at an end of the toolholding portion of said toolholder body; and
   a pull-up means to pull the collet toward the inside of said toolholder body to fasten said collet by said collet adaptor, thereby attaching said collet to said toolholder body;
   wherein sizes and shapes of said inner openings of said collet adaptors are different from one another while sizes and shapes of said outer surfaces of said collet adaptors are identical to one another, and wherein said collet tightly clamps the tool when said collet is pulled toward the inside of the toolholder body.

2. A versatile toolholder system for a numerically controlled machine tool as described in claim 1, further comprising a hook portion that is attached to the end of said attachment portion.

3. A versatile toolholder system for a numerically controlled machine tool as described in claim 2, wherein said hook portion attached to the end of said attachment portion is inserted in the attachment mechanism of the numerically controlled machine tool when mounting the tool on the numerically controlled machine tool.

4. A versatile toolholder system for a numerically controlled machine tool as described in claim 1, said attachment portion has a conical shape whose size is standardized to match with attachment mechanisms of numerically controlled machine tools of different makes and types.

5. A versatile toolholder system for a numerically controlled machine tool as described in claim 1, wherein said toolholder having the collet and the tool clamped by the collet is brought to the attachment mechanism of the numerically controlled machine tool by an automatic tool exchanging device to be mounted on the numerically controlled machine tool.

6. A versatile toolholder system for a numerically controlled machine tool as described in claim 1, wherein said inner opening of said collet adaptor is circular.

7. A versatile toolholder system for a numerically controlled machine tool as described in claim 1, wherein said pull-up means to pull said collet is a screw.

8. A versatile toolholder system for a numerically controlled machine tool as described in claim 7, wherein said screw to pull said collet has a screw head that is hooked to a stopper wall provided at the inside of said toolholder body to fixate said screw.

* * * * *